July 25, 1939.　　　F. E. TERMAN　　　2,167,162
MULTIRANGE METER
Filed Feb. 25, 1936
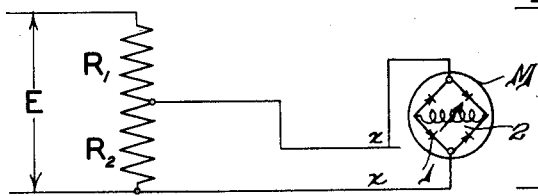
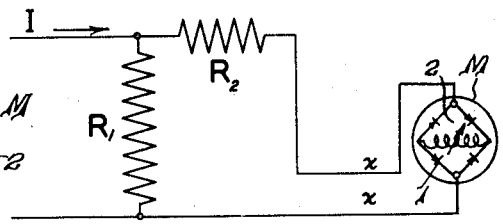
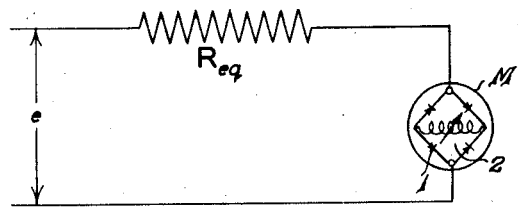
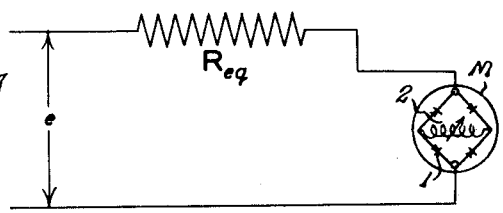
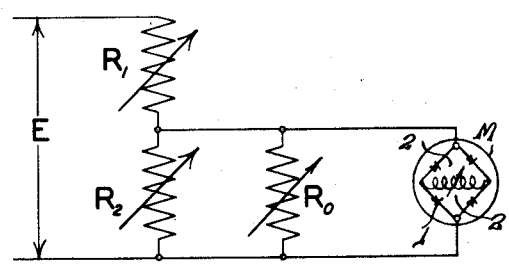
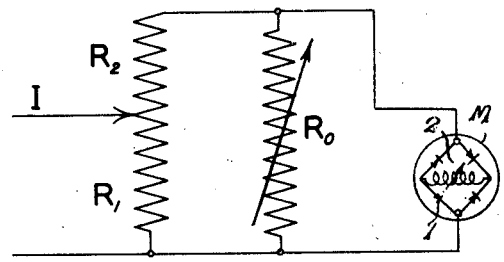
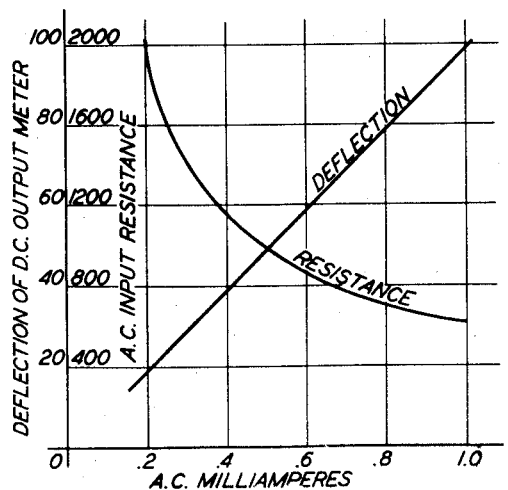
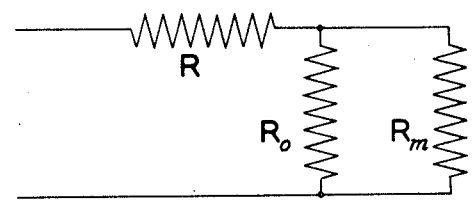
INVENTOR,
FREDERICK E. TERMAN.
BY
Lippincott & Metcalf
ATTORNEYS Patented July 25, 1939

2,167,162

UNITED STATES PATENT OFFICE 2,167,162

MULTIRANGE METER

Frederick E. Terman, Stanford University, Calif.

Application February 25, 1936, Serial No. 65,738

7 Claims. (Cl. 171—95)

My invention relates to multipliers for rectifier instruments, and more particularly to networks whereby the various ranges of multirange rectifier instruments can be made to follow the same scale gradations.

Among the objects of my invention are: To provide a network compensating for the variation of rectifier elements with current density in rectifier instruments; to provide an instrument circuit whereby the same scale gradations may be used for all ranges; to provide a means for making uniform scale gradations in rectifier instruments; and to provide a means for operating multirange rectifier instruments in such a manner as to eliminate hand drawn scales and individual calibration.

My invention posssesses numerous other objects and features of advantage, some of which, together with the foregoing, will be set forth in the following description of specific apparatus embodying and utilizing my invention. It is therefore to be understood that my invention is applicable to other apparatus, and that I do not limit myself, in any way, to the apparatus of the present application, as I may adopt various other apparatus embodiments, utilizing the invention, within the scope of the appended claims.

Referring to the drawing:

Figure 1 is a diagram showing a multiplying network which can be used for rectifier voltmeters.

Figure 2 is a diagram showing a network which can be used for rectifier ammeters.

Figure 3 is a diagram showing a circuit equivalent to that shown in Figure 1.

Figure 4 is a diagram showing a circuit equivalent to that shown in Figure 2.

Figure 5 is a diagram of a voltage multiplier having a resistance adjustable to take care of variations in rectifier element resistance.

Figure 6 is a diagram similar to that of Figure 5, used as a current multiplier.

Figure 7 is a diagram showing a circuit equivalent to that shown in Figure 5.

Figure 8 is a diagram showing the graphs of rectified direct current and resistance to the alternating current, expressed in terms of the alternating current delivered to a typical copper oxide type of rectifier.

In Figs. 1—6, M is the rectifier meter, 1 the rectifier element (preferably a copper-oxide rectifier), and 2 the needle and actuating coil.

As is well known to those skilled in the prior art, a rectifier meter comprises a full wave rectifier (usually a bridge circuit) and a direct current meter, the rectified full wave output of the rectifier being fed to the input of the meter.

The problem of supplying a rectifier instrument with multipliers to increase the range is complicated by the fact that the resistance of the rectifier element varies with current density. The result is that when conventional series resistance multipliers are used for voltmeters, and shunt multipliers for ammeters, the law of deflection depends upon the multiplier and differs with every multiplier position. This can be seen by considering a multiplier consisting of a simple series resistance. If the multiplier resistance is large, the current flowing through the instrument is substantially unaffected by the rectifier resistance since the latter is only a small fraction of the total circuit resistance. On the other hand, if the series resistance is low, corresponding to a low voltage range, the variations in the rectifier resistance are of much greater importance. The increase of rectifier resistance at low current densities then causes the current flowing through the instrument to reduce much more rapidly at low current densities than in the case where there are high current densities, and a high resistance multiplier is used. The consequence is that the scale is more bunched at the lower end.

The characteristics of rectifier instruments have been described at length elsewhere in contemporary literature. The properties of particular importance are: First, with the usual range of current densities the rectified direct current which is delivered to the direct-current instrument is very nearly proportional to the alternating current passed through the rectifier element; second, the resistance which the rectifier offers to the flow of alternating current increases as the alternating current decreases. These properties are illustrated in Figure 8.

The effect upon the ordinary rectifier voltmeter is to cause the instrument deflection to be nearly linearly proportional to voltage where the resistance in series with the rectifier is so large that the varying rectifier resistance has relatively little effect upon the alternating current flow. On the other hand, when the series resistance is low, as is the case when the voltage for full scale deflection is small, the varying resistance of the rectifier element becomes more important and the scale graduations become bunched at the lower end.

When the rectifier instrument is used as an ammeter the scale is substantially linear when there is no shunt across the rectifier input. As the rectifier element is shunted, however, the voltage across the instrument becomes largely controlled by the shunt resistance, and the scale graduations are bunched at the lower end because of the increasing resistance of the rectifier at low current densities.

The consequence of this behavior of ordinary rectifier voltmeters and ammeters is that it is necessary to have a separate scale for each range if good accuracy is to be obtained without recourse to a special calibration curve. Combined volt-ammeters are obviously even less satisfactory.

The above limitations involved with the use of ordinary multipliers can be overcome by making use of the fact that the law according to which the scale of a particular rectifier instrument must be graduated depends only upon the equivalent resistance of the network connected across the rectifier terminals, and does not depend upon the multiplying factor which this network introduces.

The term "equivalent output resistance", as used in this specification, refers to the equivalent resistance of the multiplier network that is connected across the meter input when this network is viewed from the output terminals of the network. In the case of a multiplier network for voltage, the equivalent output resistance is defined as the resistance which is observed by looking toward the network from its output terminals when the source of voltage applied to the network is short circuited. Thus in the case of the multiplier network $R_1R_2$ shown in Fig. 1, the equivalent output resistance is the resistance of $R_1$ in parallel with $R_2$, since when the source of voltage E is short circuited, the network, as viewed from the output terminals consists of $R_1$ and $R_2$ in parallel. On the other hand, in the case of current multiplier networks the output resistance is defined as the resistance which is observed when looking toward the network from the output terminals with the source of current open circuited. Thus in Fig. 2 the equivalent output resistance of this network is the resistance of the network when viewed from terminals $xx$ with the source of current open circuited. The output resistance in this case is, accordingly, $R_1$ plus $R_2$.

This statement can be readily proved by using Thëvenin's theorem, according to which any network can be reduced to an equivalent source consisting of a voltage $e$ in series with an equivalent resistance $R_{eq}$ where $e$ is the voltage developed at the output terminals when the output load is removed, and $R_{eq}$ is the resistance looking into the network from the output terminals with the ultimate source of voltage short-circuited. By keeping the equivalent resistance $R_{eq}$ constant while varying the nature of the network, it is possible to vary the equivalent voltage $e$ that can be considered as acting in series with the network in Figs. 3 and 4, without altering the equivalent circuit of the instrument, and hence leaving the law of scale variation unchanged.

Almost any sort of attenuation network can be employed. The ones most satisfactory for ordinary purposes, and also the simplest, are shown in Figures 1 and 2, and combine a single shunt element with a single series element. In the network of Figure 1, together with its equivalent circuit shown in Figure 3, which is primarily adapted to voltage measurements, the effective network resistance $R_{eq}$ is the impedance across the output terminals $xx$ in Figure 1 when looking into the network with E short-circuited. This gives $$\text{equivalent resistance } R_{eq} = \frac{R_1 R_2}{R_1 + R_2} \quad (1)$$

The equivalent voltage $e$ is the open circuit potential across $xx$, and so is $$\text{equivalent voltage } e = E \frac{R_2}{R_1 + R_2} \quad (2)$$

It is apparent by an examination of (2) that the multiplying factor depends upon the ratio $R_1/R_2$ and can be varied over a wide range while maintaining $R_{eq}$ constant.

The exact relations which $R_1$ and $R_2$ must satisfy to give any particular full scale deflection while maintaining $R_{eq}$ constant can be readily worked out as follows:
Let, $R_m$ = resistance of rectifier meter to alternating current at full scale deflection (when $R_m$ is hereinafter referred to, in the specifications or claims, it should be interpreted as being the internal resistance at full scale deflection, otherwise inaccuracies of meaning will arise)

$I_m$ = alternating current which must be delivered to the rectifier input to give full scale deflection $V$ = value of E required to give full scale deflection.

Then by making use of (2) and the equivalent circuit $$I_m = \frac{VR_2}{R_1 + R_2}/(R_{eq} + R_m) \quad (3)$$

Next by combining (3) and (1) to eliminate $R_2$, we get the value of $R_1$ required for a given value of V in terms of $R_m$, $I_m$, and $R_{eq}$:

$$R_1 = \frac{V}{I_m \left(1 + \frac{R_m}{R_{eq}}\right)} \quad (4)$$

Knowing $R_1$ and $R_{eq}$, one can now calculate $R_2$ by (1), $$R_2 = \frac{R_1 R_{eq}}{R_1 - R_{eq}} \quad (4a)$$

Examination of these equations shows that the possibility of using the same scale for all ranges arises as a result of operating the instrument so that the ohms per volt varies with the multiplying factor. In general, the higher the voltage range the lower will be the ohms per volt. The linearity of the scale also increases as the ratio $R_{eq}/R_m$ is made larger, with the highest possible value of $R_{eq}/R_m$ fixed by the lowest range desired; i. e., when $R_2 = \infty$.

The network of Figure 2, together with its equivalent circuit shown in Figure 4, is primarily adapted for current multipliers. The equivalent resistance of this network is the resistance measured across the output terminals $xx$ when the source of current is open-circuited. This open-circuit condition applies because the constant current source can be thought of as an infinitely large voltage in series with an infinitely large resistance. We hence have $$R_{eq} = R_1 + R_2 \quad (5)$$

$$e = IR_1 \quad (6)$$

We note here that for constant $R_{eq}$ but varying sensitivity we merely tap the fixed resistance $(R_1 + R_2)$ at varying points. This arrangement is very similar to the Ayrton-Mather universal shunt so commonly used with galvanometers, but we are here interested in a load of varying resistance rather than a shunt which will always give the same multiplying factors when used with different galvanometers. The design formulas for the current network can be worked out as follows, where J is the line current I for full scale deflection:

$$I_m = \frac{JR_1}{R_{eq} + R_m} \quad (7)$$

Solving $R_1$ we obtain the required resistances in terms of the line current J required to give full scale deflection, the alternating-current resistance $R_m$ of the rectifier input, and the equivalent resistance $R_{eq}$ desired:

$$R_1 = \frac{I_m}{J}(R_{eq} + R_m) \quad (8)$$

$$R_2 = R_{eq} - R_1 \quad (9)$$

We note that in this case we are able to use the same scale for all ranges by virtue of the fact that the number of volts required for full scale deflection is allowed to increase as higher current ranges are used. In order to obtain a linear scale it is necessary that $R_{eq}/R_m$ be made large, and this means high voltage drop for full scale deflection. The maximum sensitivity which can be obtained for a particular scale occurs when $R_2 = 0$, and increases with $R_{eq}$ being employed.

In designing networks of the type described above it is preferable that the resistance elements be, as far as practical, free from inductance. This is particularly true when the systems are to be used for measuring voltages of comparatively high frequency, such as are found in the audio frequency range.

In the practical application of multiplier systems of this type difficulty is encountered from the fact that the resistance $R_m$ can be made the same for a number of rectifier units only with considerable difficulty and expense. If a simple system such as shown in Figures 1 to 4 is employed, this means each multiplier must be individually proportioned for the particular rectifier element with which it is to be used, or specifically selected rectifiers must be used.

This disadvantage can be overcome by arrangements as shown in Figs. 5 and 6, for voltage and current multiplication respectively, and which have the equivalent circuit shown in Fig. 7. This is a multiplier provided with an adjustable resistance $R_o$ shunted across its output. The multiplier may be of any convenient type. This multiplier is designed to operate with a rectifier unit requiring the same current for full scale deflection as the rectifier instruments to be actually employed, but having a higher resistance. The resistance $R_o$ is then shunted across the output terminals of the multiplier as shown in Figs. 5 and 6. This resistance is adjusted so that the sensitivity of the metering system employing a rectifier instrument of the same sensitivity, but of a lower resistance than the rectifier meter for which the multiplier was designed, is the same as would be obtained by the actual multiplier operating into a rectifier meter having the resistance called for by the design. In other words, $R_o$ is adjusted to reduce the sensitivity of the system just the right amount to compensate for the increase in sensitivity that would otherwise result from the fact that the actual rectifier has less resistance than the value called for in the design of the multiplier. It will be noted that since the equivalent output resistance of the multiplier is constant irrespective of the multiplying factor being used that the required value of $R_o$ depends only on the meter resistance and not upon the multiplying factor. When $R_o$ has been adjusted as described, it can be shown as is done below, that the equivalent output resistance $R'$ of the network formed by the multiplier with its output shunted by $R_o$ ($R'$ is the output resistance of the network actually delivering current to the meter in Figs. 5 and 6) is such that the ratio $R'/R_m'$, where $R_m'$ is the resistance of the meter actually used, is always the same irrespective of the meter resistance $R_m'$. Furthermore, since the law of scale graduations depends primarily upon $R'/R_m'$, rectifier meters of similar sensitivity but different resistance will follow the same scale. It is to be noted therefore that the adjustment of $R_o$ to compensate for the effect of meter resistance on the sensitivity of the entire system is also the proper adjustment for making the meters of different resistance follow the same law of scale graduations. The result is that a standard multiplier with numerous taps can be built in quantity and be adapted to rectifier instruments with different values $R_m$ by adjusting the single resistance $R_o$.

As an illustration, assume that the rectifier units employed will give values of $R_m$ ranging from 600 to 700 ohms. The multiplier would then be designed to operate with an instrument having the same current sensitivity but a higher value of $R_m$, say 750 ohms. Each multiplier would then be individually fitted to the value of $R_m$ of the rectifier element with which it was to be used by adjusting the resistance $R_o$. Thus, if the desired ratio of $R_{eq}/R_m$ was 2, then the output resistance of the multiplier before shunting with $R_o$ would be $2 \times 750 = 1500$ ohms. If $R_m = 650$ for the particular rectifier element in which one was interested, then the desired effective output resistance is $2 \times 650 = 1300$ ohms, and would be obtained by making $R_o = 9750$, since 1500 ohms and 9750 ohms in parallel equals 1300.

The theory for this follows:

Let, referring to Figure 7,
$R$ = output resistance of multiplier as designed
$R_m$ = rectifier resistance required for an output resistance of R
$R'_m$ = resistance of actual rectifier unit
$R'$ = desired output resistance for actual rectifier unit
$\phi$ = $R/R_m = R'/R'_m$ = proper ratio of output to rectifier resistance to give desired scale calibration
$R_o$ = resistance shunted across multiplier output to reduce resistance R to the desired value $R'$ One first has the following auxiliary relations which must be satisfied:

$$\frac{RR_o}{R + R_o} = R'$$

$$R_o = \frac{RR'}{R - R'}$$

$$R'_m = \frac{R'R_m}{R} = \frac{R_o R_m}{R + R_o}$$

It can now be shown that the full scale sensitivity is the same irrespective of the value of $R'_m$ provided $R_o$ is such that $R'/R'_m$ has the desired value. The first step is to represent by V the open circuit voltage appearing across the output of the multiplier ($R_o$ and meter removed) when the desired full scale input is supplied to the multiplier. When $R_o$ and the rectifier resistance $R'_m$ are both shunted across the output of the multiplier, the current through the meter is found from Figure 7 to be:

$$\text{Meter current} = \frac{V}{R + \frac{R_o R'_m}{R_o + R'_m}} \times \frac{R_o}{R'_m + R_o}$$

$$= \frac{V}{R + \frac{R'_m R}{R_o} + R'_m}$$

By making use of the auxiliary relations this becomes:

$$\text{Current} = \frac{V}{R + \frac{R_o R_m}{R + R_o}} \times \left(\frac{R + R_o}{R_o}\right)$$

$$= \frac{V}{R + R_m}$$

This is the desired result since $R$, $R_m$, and $V$ are all independent of the actual rectifier resistance $R'_m$.

Investigation of the way in which the resistance of a rectifier unit varies with current density indicates that even when the resistance $R_m$ is different with different instruments, the law of relative variation of resistance is substantially the same. This makes it possible to use the same printed scale for rectifier instruments having different values of $R_m$ provided a multiplying system such as disclosed above is employed. This is important since it means that hand drawn scales are not necessary because of variations in $R_m$.

I claim:

1. A multirange electrical measuring system comprising, a source of electromotive force to be measured, a rectifier type meter, a multiplier network connected between the source of electromotive force to be measured and the said meter, said multiplier network comprising a variable resistor in series with, and a variable resistor in shunt with the said meter, the equivalent resistance of said network being so selected and constructed that it gives a desired ratio of $$\frac{R_{eq}}{R_m}$$

wherein $R_{eq}$ represents the equivalent resistance of the network, and $R_m$ represents the resistance of a rectifier meter having the same current sensitivity as, but a higher resistance than, the rectifier meter normally used in the system, and an additional resistance shunting said rectifier meter, whereby adjustment of the additional resistance accomplishes compensation for the differential internal resistance of different rectifier meters to be used in the said system, and gives a predetermined overall sensitivity for the entire measuring system.

2. A multirange ammeter system comprising, a source of current to be measured, a rectifier type ammeter, an impedance network connected in circuit with the source of current and the rectifier ammeter, said impedance network comprising a variable resistor in series with and a variable resistor in shunt with the said rectifier meter, the impedance network being designed to have a desired ratio of $$\frac{R_{eq}}{R_m}$$

wherein $R_{eq}$ represents the equivelent resistance of the network, and $R_m$ represents the resistance of a rectifier ammeter having the same current sensitivity as, but a higher resistance than, the rectifier meter normally used in the system, and an additional variable resistance shunted across said rectifier meter, whereby adjustment of said additional resistance compensates for the different internal resistance of different rectifier ammeters to be used in the system, and gives a predetermined overall sensitivity for the entire measuring system.

3. A meter as defined in claim 1, wherein each of said resistances is provided with taps so arranged that the multiplying factor of said network may be varied for different voltage ranges to be measured, while the equivalent resistance of said network is maintained constant, thus causing the meter to follow the same law of scale graduation due to the varying internal resistance of the meter with varying current flowing therethrough.

4. An ammeter as defined in claim 2, wherein each of said resistances is provided with taps so arranged that the multiplying factor of said network may be varied for different current ranges to be measured, while the equivalent resistance of said network is maintained constant, thus causing the ammeter to follow the same law of scale graduation due to the varying internal resistance of the ammeter with varying current flowing therethrough.

5. A multirange metering system comprising a rectifier meter, a multiplier network which comprises a resistance in series with, and a resistance in shunt with said rectifier meter connected to said meter, and means for adjusting the system to compensate for inaccuracies in the inherent internal resistance of said rectifier meter, the equivalent resistance ($R_{eq}$) of said network being of such a value as to give a desired ratio of $R_{eq}/R_m$, where $R_m$ is the resistance of a rectifier meter having the same current sensitivity as, but a higher resistance than, the said meter normally used in the system, said compensating means comprising an adjustable resistance $R_o$ shunting said meter used in the system and adjusted so that the equivalent output resistance of the network plus the resistance $R_o$ will have a value $R'$, the value $R'$ being such that the ratio $R'/R'_m$ equals the ratio $R_{eq}/R_m$, wherein $R'_m$ is the inherent internal resistance of the said meter normally used in the system, thus giving a meter current of $$\frac{V}{R_{eq} + R_m}$$

where V is the open circuit potential at the output of the multiplier network, whereby the deflection of said meter, controlled by said meter current, will have a definite known ratio to any electrical quantity being measured.

6. A multirange metering system comprising a rectifier meter, a multiplier network including a plurality of series and parallel connected resistors, variable to obtain a plurality of multiplying factors, and having a predetermined constant output resistance throughout all multiplying factor adjustments, to provide a predetermined ratio between the output resistance of said network and the resistance offers by a rectifier meter of a specified sensitivity at full scale deflection, and an adjustable resistance connected across the output of said network and adjusted to obtain a new equivalent output resistance for the network plus the shunting resistance, said new output resistance having such a value that it gives the same predetermined ratio between the new output resistance of the network and the internal resistance of any meter having the same sensitivity as the second mentioned meter but having a slightly lower internal resistance at full scale deflection.

7. A multirange metering system, comprising a rectifier meter, a multiplier network having input terminals, and output terminals for connection to the rectifier meter, said multiplier network comprising a variable resistance in series with, and a variable resistance in shunt with the meter when it is connected to said output terminals, the equivalent output resistance of said network as measured across said output terminals being so selected that it gives a desired ratio of $$\frac{R_{eq}}{R_m}$$

wherein $R_{eq}$ represents the equivalent output resistance of the network, and $R_m$ represents the resistance of a meter of a specified sensitivity, at full scale deflection, and an additional variable resistance in parallel with said shunting resistance to alter the value of said equivalent output resistance to obtain a ratio $$\frac{R'_{eq}}{R'_m}$$

numerically equal to the aforementioned ratio $$\frac{R_{eq}}{R_m}$$

where $R'_{eq}$ is the new equivalent output resistance of the network and $R'_m$ is the resistance at full scale deflection of a meter having the same sensitivity as, but a slightly lower resistance at full scale deflection than, the second-mentioned meter.

FREDERICK E. TERMAN.